United States Patent
Osterhout et al.

(10) Patent No.: US 7,149,506 B2
(45) Date of Patent: Dec. 12, 2006

(54) PORTABLE CALL MANAGEMENT SYSTEM

(75) Inventors: Gregory T. Osterhout, Coppell, TX (US); Kim B. Holmes, Rowlett, TX (US); Mark Sosebee, Plano, TX (US)

(73) Assignee: Nortel Networks Limited, St. Laurent (CA)

( * ) Notice: Subject to any disclaimer, the term of this patent is extended or adjusted under 35 U.S.C. 154(b) by 13 days.

(21) Appl. No.: 10/199,797

(22) Filed: Jul. 19, 2002

(65) Prior Publication Data

US 2002/0187777 A1    Dec. 12, 2002

Related U.S. Application Data

(62) Division of application No. 09/419,175, filed on Oct. 15, 1999.

(51) Int. Cl.
*H04M 3/42* (2006.01)
*H04Q 7/20* (2006.01)

(52) U.S. Cl. .......... 455/417; 455/435.1; 455/436; 455/442; 340/3.5; 340/3.52

(58) Field of Classification Search .......... 455/417, 455/412.1, 412.2, 414.1, 415, 425, 458, 459, 455/463, 466, 556.1, 556.2, 442, 445, 435.1, 455/435.2, 435.3, 438, 439, 414.4, 432.2; 709/217, 219, 220, 227; 340/3.52–3.54, 340/825.29, 7.46, 7.47, 7.52, 825.52, 3.5, 340/7.45

See application file for complete search history.

(56) References Cited

U.S. PATENT DOCUMENTS

| 5,862,481 | A | * | 1/1999 | Kulkarni et al. | 455/432.2 |
|---|---|---|---|---|---|
| 5,913,166 | A | * | 6/1999 | Buttitta et al. | 455/436 |
| 6,161,134 | A | * | 12/2000 | Wang et al. | 709/220 |
| 6,421,536 | B1 | * | 7/2002 | Uranaka et al. | 455/417 |
| 6,526,277 | B1 | * | 2/2003 | Zicker et al. | 455/426.2 |
| 6,856,676 | B1 | * | 2/2005 | Pirot et al. | 379/201.01 |
| 2002/0118800 | A1 | * | 8/2002 | Martinez et al. | 379/67.1 |

OTHER PUBLICATIONS

Handley et al., SIP: Session Initiation Protocol; Mar. 1999, pp. 1-134.
3Com Corporation, "Web Clipping Developer's Guide", Document No. 3009-001; Print Date Aug. 7, 1999, pp. 1-93.

* cited by examiner

*Primary Examiner*—Tony T. Nguyen (57) ABSTRACT

A method of redirecting a call from a data processing system to another address. In a preferred embodiment, a notice of an incoming call received from a server at a data processing system. This notice may include caller identification information as well. The user of the data processing system is prompted for an address to which the user wishes the call to be redirected. The user then identifies and sends to the server a new address to which the incoming call is to be redirected. The server then redirects the call to the new address.

15 Claims, 10 Drawing Sheets

Figure 1
100
Network

400
Client

PORTABLE CALL MANAGEMENT SYSTEM

This application is a divisional of application Ser. No. 09/419,175, filed Oct. 15, 1999, status pending.

FIELD OF THE INVENTION

The present invention relates to telecommunications systems and, more specifically, to methods of transferring calls real time from one device to another.

BACKGROUND OF THE INVENTION

Historically, when a caller telephoned a party, if the party to which the caller wished to speak with did not answer the phone or if the line was busy, the caller had to hang up and redial at a later time hoping that the second call would reach the intended party. Often times, the caller would need to attempt to contact the party multiple times in order to reach that party. If the caller had urgent information in which time was of the essence, this method was unsatisfactory and often resulted in the intended party missing important business or other opportunities.

Some of these problems were alleviated with the introduction of answering machines and voice mail systems. However, even these solutions were not completely satisfactory. For instance, utilizing answering machines and voice mail systems required the called party to actively retrieve their messages. Thus, either many important messages were still not received in a timely manner if the called party did not retrieve their messages frequently or the called party was required to check their voice mail or answering machine quite frequently when the party was out of the office or home in order to insure that messages were retrieved quickly. Thus, this results in the same problem as having the caller repeatedly call the intended party, except that in this case it is the called party that must waste its time insuring that no messages are missed.

A more recent solution to this problem is the introduction of subscriber's static reach list. A static reach list enabled a subscriber (i.e., called party) to enter a list of telephone numbers (or IP addresses, etc.) where the subscriber might be reached. The subscriber would enter these numbers in the order of preference in which the subscriber wished the telecommunications system to try to reach the subscriber. Therefore, if the subscriber were going to be away from the location of the subscriber's normal telephone number, if a call were received for the subscriber, the telecommunications system would redirect the subscriber's calls to the next number on the static reach list until the subscriber were reached or until the list of numbers was exhausted.

However, this method required the subscriber to know in advance the telephone number or other communications address at which the subscriber would be while traveling. Many times such information is unknowable either because the person does not know a number at the location to which they are travelling or because the person does not know sufficiently in advance where they will be in order to update the static reach list with the appropriate number. Therefore, it would be beneficial to have a method of to prevent a called party from missing calls without being required to know the number of a phone at which they will be in advance.

SUMMARY OF THE INVENTION

The present invention solves the problem of preventing a called party from missing calls without having to know in advance the number at which they will be by providing a method and apparatus for redirecting a call from a data processing system to another address. In a preferred embodiment, a notice of an incoming call received from a server at a data processing system. This notice may include caller identification information as well. The user of the data processing system is prompted for an address to which the user wishes the call to be redirected. The user then identifies and sends to the server a new address to which the incoming call is to be redirected.

In another aspect of the present invention, an SIP server receives a notice of a call and forwards the notice to a SIP user agent. The SIP proxy server then identifies the address to which the called party wishes the call sent from a database of preferred locations. The called party has previously registered their preferred location to this database. The SIP user agent then sends a message to the called party that they have an incoming call. The called party then identifies a phone number or IP address to which the called party wishes the call to be redirected. Thus, the called party can have their calls originally directed to their handheld personal digital assistant or other data processing device. Thus, when a call is received, the called party can determine at that time how to dispose of the call.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
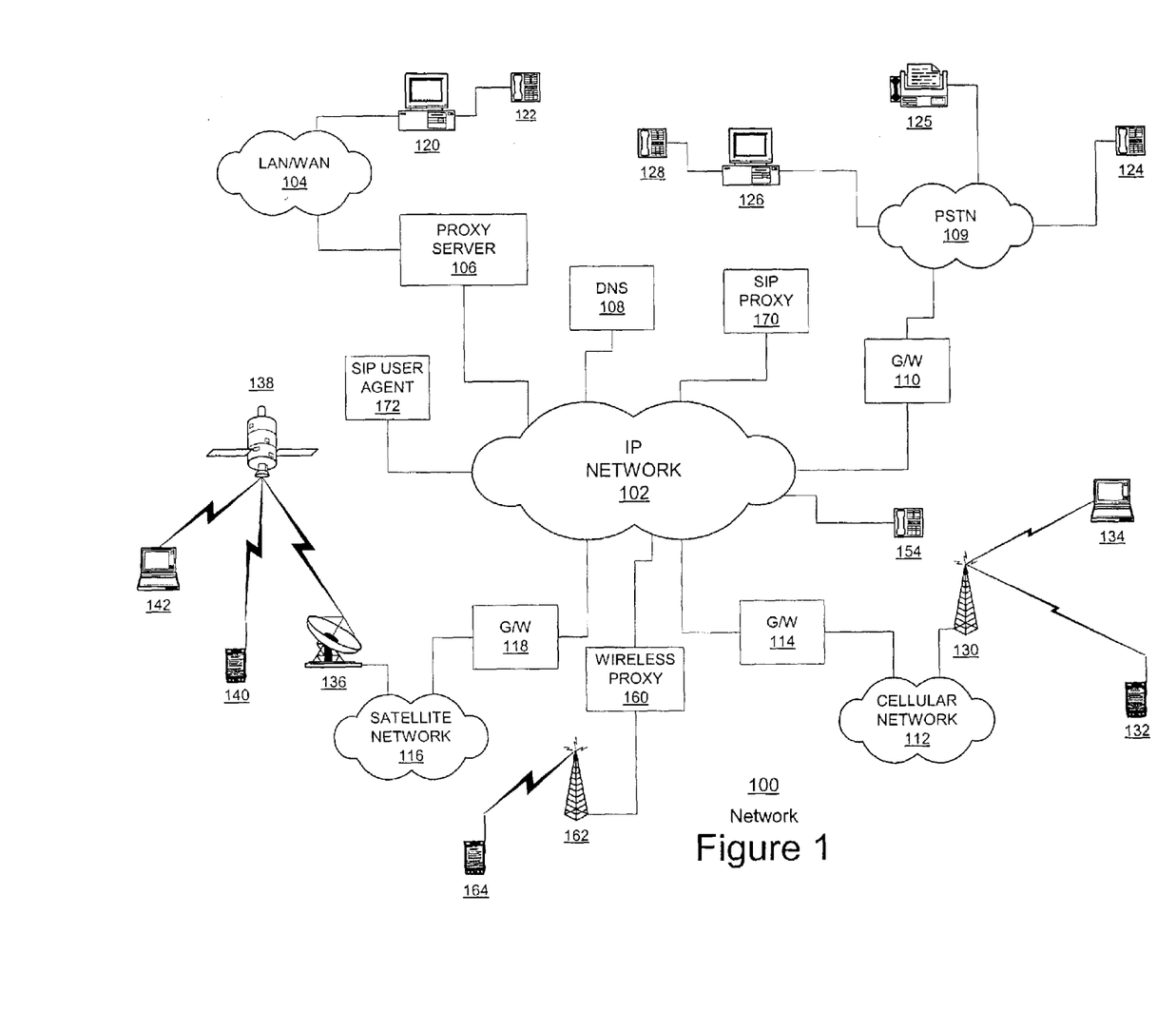
FIG. 1 depicts a block diagram illustrating a communications network in which the present invention may be implemented.

With-reference now to the figures, and in particular with reference to FIG. 1, a system diagram illustrating a plurality of interconnected heterogeneous networks in which the present invention may be implemented is depicted. As illustrated, an Internet Protocol (IP) network 102, a Local Area Network (LAN)/Wide Area Network (WAN) 104, the Public Switched Telephone Network (PSTN) 109, a cellular wireless network 112, and a satellite communication network 116 make up the plurality of heterogeneous networks serviced by the personal mobility system of the present invention.

IP network 102 may be the publicly available IP network, a private IP network, or a combination of public and private IP networks. In any case, IP network 102 operates according to the Internet Protocol and routes packets among its many switches and through its many transmission paths. IP networks are generally known in the art to be expandable, fairly easy to use and heavily supported. Coupled to IP network 102 is a Domain Name Server (DNS) 108 to which queries may be sent, such queries each requesting an IP address based upon a Uniform Resource Locator (URL). IP network 102 supports 32 bit IP addresses as well as 128 bit IP addresses, which are currently in the planning stage.

LAN/WAN 104 couples to IP network 102 via a proxy server 106 (or another connection). LAN/WAN 104 may operate according to various communication protocols, such as the Internet Protocol, the Asynchronous Transfer Mode (ATM) protocol, or other known packet switched protocols. Proxy server 106 serves to route data between IP network 102 and LAN/WAN 104. A firewall that precludes unwanted communications from entering LAN/WAN 104 may also be located at the location of proxy server 106.

Computer 120 couples to LAN/WAN 104 and supports communications with LAN/WAN 104. Computer 120 may employ the LAN/WAN and proxy server 106 to communicate with other devices across IP network 102. Such communications are generally known in the art and will not be further described herein except to expand upon the teachings of the present invention. As is also shown, phone 122 couples to computer 120 and may be employed to initiate IP Telephony communications with another phone or voice terminal using IP Telephony. In such an IP telephony system, a gatekeeper 152 is deployed by a service provider to manage IP telephony for its users. An IP phone 154 connected to IP network 102 (or other phone, e.g., phone 124) may communicate with phone 122 using IP telephony.

PSTN 109 is a circuit switched network that is primarily employed for voice communications, such as those enabled by a standard phone 124. However, PSTN 109 also supports the transmission of data. Data transmissions may be supported to a tone based terminal, such as a FAX machine 125, to a tone based modem contained in computer 126, or to another device that couples to PSTN 109 via a digital connection, such as an Integrated Services Digital Network (ISDN) line, an Asynchronous Digital Subscriber Line (ADSL), or another digital connection to a terminal that supports such a connection. As illustrated, a voice terminal, such as phone 128, may couple to PSTN 109 via computer 126 rather than being supported directly by PSTN 109, as is the case with phone 124. Thus, computer 126 may support IP telephony with voice terminal 128, for example.

Cellular network 112 supports wireless communications with terminals operating in its service area (which may cover a city, county, state, country, etc.). As is known, cellular network 112 includes a plurality of towers, e.g., 130, that each service communications within a respective cell. Wireless terminals that may operate in conjunction with cellular network 112 include wireless handsets 132 and wirelessly enabled laptop computers 134, for example. Wireless handsets 132 could be, for example, personal digital assistants, wireless or cellular telephones, or two-way pagers. Cellular network 112 couples to IP network 102 via gateway 114.

Wireless handsets 132 and wirelessly enabled laptop computers 134 may communicate with cellular network 112 using a wireless application protocol (WAP). WAP is an open, global specification that allows mobile users with wireless devices, such as, for example, mobile phones, pagers, two-way radios, smartphones, communicators, personal digital assistants, and portable laptop computers, to easily access and interact with information and services almost instantly. WAP is a communications protocol and application environment and can be built on any operating system including, for example, Palm OS, EPOC, Windows CE, FLEXOS, OS/9, and JavaOS. WAP provides interoperability even between different device families.

WAP is the wireless equivalent of Hypertext Transfer Protocol (HTTP) and Hypertext Markup Language (HTML). The HTTP-like component defines the communication protocol between the handheld device and a server or gateway. This component addresses characteristics that are unique to wireless devices, such as data rate and round-trip response time. The HTML-like component, Wireless Markup Language (WML), defines new markup and scripting languages for displaying information to and interacting with the user. This component is highly focused on the limited display size and limited input devices available on small, handheld devices. For example, a typical cell phone may have only a 4×10-character display with 16-gray levels and only a numeric keypad plus up/down volume keys.

Cellular network 112 operates according to an operating standard, which may be the Advanced Mobile Phone System (AMPS) standard, the Code Division Multiple Access (CDMA) standard, the Time Division Multiple Access (TDMA) standard, or the Global System for Mobile Communications or Groupe Speciale Mobile (GSM), for example. Independent of the standard(s) supported by cellular network 112, cellular network 112 supports voice and data communications with terminal units, e.g., 132 and 134.

Satellite network 116 includes at least one satellite dish 136 that operates in conjunction with a satellite 138 to provide satellite communications with a plurality of terminals, e.g., laptop computer 142 and satellite handset 140. Satellite handset 140 could also be a two-way pager. Satellite network 116 may be serviced by one or more geosynchronous orbiting satellites, a plurality of medium earth orbit satellites, or a plurality of low earth orbit satellites. In any case, satellite network 116 services voice and data communications and couples to IP network 102 via gateway 118.

Wireless Proxy 160 is coupled to IP network 102 and is coupled to a plurality of towers, e.g., 162, which each provide wireless communications with wireless devices such as wireless device 164. Wireless Proxy 160 provides access to IP network 102 to wireless device 164, such as personal digital assistants (PDAs), that may require proprietary or other special protocols in order to communicate with IP network 102. For example, wireless proxy server 160 may be a 3Com server utilizing 3Com protocols for communicating with a Palm VII, a handheld portable computing device available from 3Com Corporation in Santa Clara, Calif.

In a preferred embodiment of the present invention, wireless proxy 160 is a 3Com proxy server supporting communications with Palm VII personal organizer and portable computing device 164 is a Palm VII personal organizer. In this embodiment, communications between wireless proxy server 160 and portable computing device 164 is facilitated by the use of Palm Query Applications (PQAs). A PQA is like a mini-Web site that resides on portable computing device 164. That is, a PQA is a special kind of record database. A typical PQA contains an HTML form or a list of hyperlinks that request additional information either locally—on personal computing device 164—or remotely—on the Internet.

Much of the content on the Internet is designed to take advantage of the power of Pentium/RISC-class computers with large, high resolution color monitors and fast and cheap Internet access. In these circumstances, there is little reason to economize on the abundant connect time and large file size that make Web browsing such a rich, multimedia experience from a desktop or notebook computer.

However, this model is not the best model for a small, low-power computer like the Palm VII organizer with its tiny screen, battery powered operation, and relatively slow and expensive wireless connection to the Internet. Rather than duplicate the Web browsing model on a handheld computer, PQAs are developed that access targeted bits of Internet information—like clippings from a newspaper. Typically, a handheld computer user does not focus on following hyperlinks to the Internet (although this is available), but instead, they compose a simple query in the PQA (for example a request for a stock quote) and then send that query over the air.

Also included in network 100 is a Session Initiation Protocol (SIP) proxy 170. SIP proxy 170 is connected to IP network 102 and provides switching and routing for communication over IP network 102. SIP proxy 170 also maintains a static list of preferred locations to which a user wishes telephone calls or other communication types sent. When a request to initiate a communications session is received, SIP proxy 170 retrieves the static list of the called party and routes the call to the top address in the static list. If the communications session is not established with the top address in the static list, then SIP proxy 170 may attempt to access the next address in the list and so on until the called party is reached or until the addresses in the static list are exhausted.

SIP is a textual based signaling protocol for creating, modifying and terminating sessions. These sessions can be multimedia conferences, Internet telephone calls and similar applications consisting of one or more media types such as, for example, audio, video, or whiteboard. SIP invitations are used to create sessions and carry session descriptions, which allow participants to agree on a set of compatible media types. SIP requests can be sent either over TCP or UDP.

SIP User Agent 172 is also connected with IP Network 102. SIP User Agent 172 translates between SIP communications and Hypertext Transfer Protocol (HTTP) and other extensible markup language (XML) based protocols such as Voice XML (VOXML) and Wireless Application Protocol (WAP).

FIG. 1 is intended as an example and not as an architectural limitation for the processes of the present invention.

In a preferred embodiment, a user registers an address to which they wish their voice calls or other communications to be sent. The address can be an IP address, a PSTN address or other type of address for locating an electronic device such as a data processing system or telephone. As an example, consider a user of portable device 164 wishing to have all of their calls routed to the portable device. The user of portable device 164 sends an HTML registration request to Wireless Proxy 160, which then forwards the HTML registration request to SIP User Agent 172. SIP User Agent SIP 172 translates the HTML registration request from HTML into an SIP registration statement and sends the SIP registration statement to SIP Proxy 170. SIP Proxy 170 then updates the user's static list and inserts the newly received address into the top of the static list as the first address to attempt to establish a connection with if a request to initiate communications with that user is received. If the user does not have a static list, SIP Proxy 170 can create one and then place the received address in the newly created static list. The registration request does not have to initiate from a portable wireless device such as portable device 164 but may initiate with a LAN based data processing system such as client 120 or with some other type of wireless device.

When SIP Proxy 170 receives a request to initiate communications, such as a voice telephone call, with a user, SIP Proxy 170 retrieves the static list for the called party and determines the first address to contact. SIP Proxy 170 then sends an SIP Invite message to SIP User Agent 172. SIP User Agent 172 translates the SIP Invite message into an HTML message and sends the HTML message to Wireless Proxy 160 which then forwards the HTML message to portable device 164.

Once the HTML invite message is received at portable device 164, the user may then determine how to dispose of the call. If portable device 164 is a telephone (or supports voice communications), the user may choose to take the call if it is someone to which the user wishes to speak. The user may also redirect the call elsewhere to a nearby PSTN address, to a voice mailbox, or to an IP address. Portable device 164 may even suggest options as to disposal of the incoming communication. For example, if the incoming communication is video, rather than a voice call, portable device 164 may suggest routing the communication to client 120 on LAN/WAN 104, which may be the nearest device capable of receiving such communication.

If the user decides to redirect the call to some other device, then redirection information in HTML format indicating the address of the new device is sent from portable device 164 to wireless proxy 160. Wireless proxy 160 then forwards the HTML redirect information to SIP User Agent 172, which converts the HTML redirect information into an SIP redirect and send the SIP redirect to SIP proxy 170. SIP User Agent 172 also sends an HTML notification to portable device 164 via wireless proxy 160 indicating that the communication is being redirected. SIP proxy 170 then redirects the communication to the new address and takes down the connection with portable device 164. If SIP proxy 170 is unable to make a connection with the new address (e.g., incorrect address, device off-line, etc.), then the communication must be terminated or the next address in the user's static list contacted. This is because the connection to portable device 164 has already been taken down thus preventing an attempt to request a new address to which to redirect the communication.

As an example of uses of such redirection methods and systems according to the present invention, consider a family consisting of a husband, wife, and children. Perhaps the husband has registered his wireless telephone as the device to which incoming calls to his home telephone should be delivered. If notification of an incoming call is received by the husband on his wireless telephone, he can look at the display to see who the caller is. If the husband determines that the call is for his wife, he can redirect the call to her work phone or to her wireless phone. If the call is for one of the children, the call can be redirected to the home phone. However, if the call is for the husband, he can choose to take the call on his wireless telephone. Alternatively, if the call is for the husband, but he does not wish to speak with the caller, the call can be forwarded to his voice mailbox.

As another example of the use of redirection methods and systems according to the present invention, consider a person travelling on business and away from the office. The business person can register a personal digital assistant (PDA) as the device to which incoming calls are directed. Thus, wherever the business person is, no calls will be misses because of being away from the office. If notification of a call is received, the business person can have the call redirected to a phone near where the business person is presently located. Such phone could be the room phone of the hotel where the person is currently staying or it could be the office phone of the person with which the business person is meeting.

Figure 2:
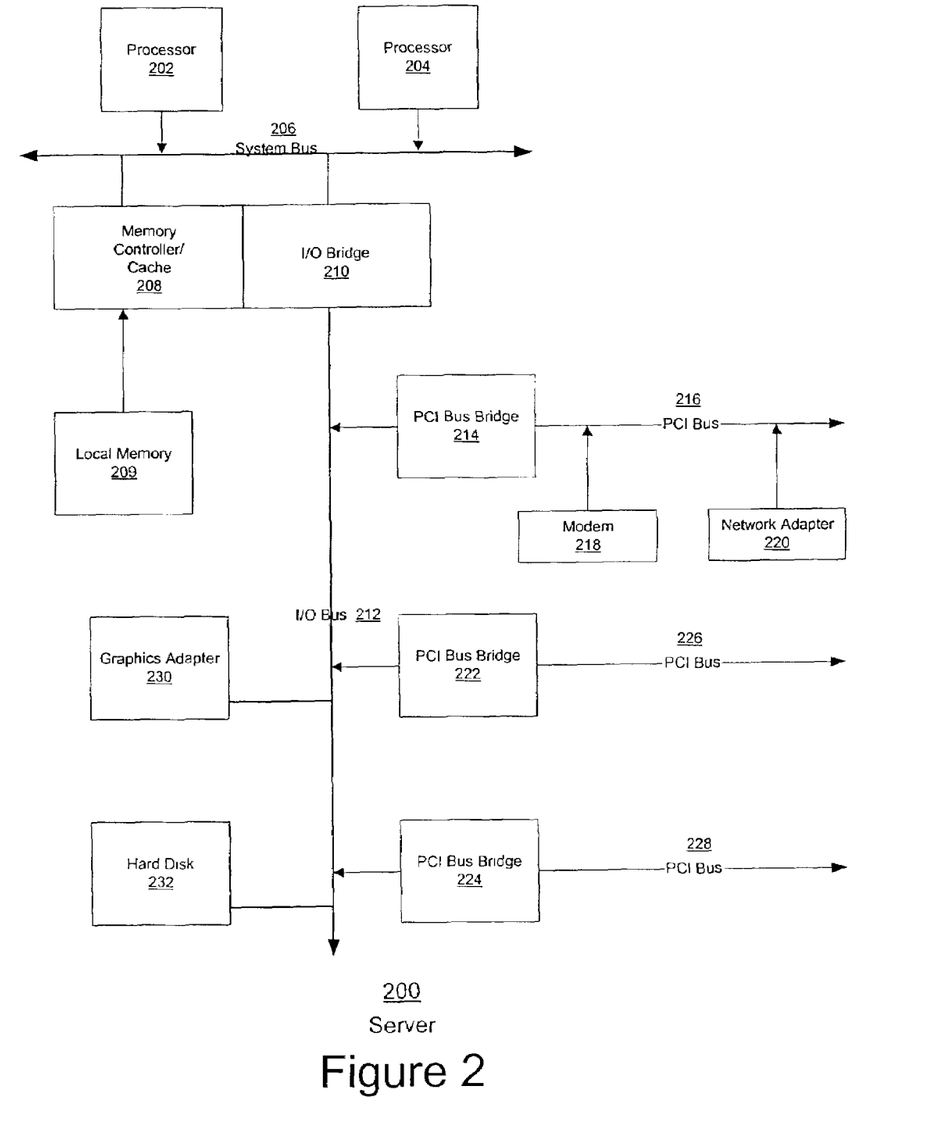
FIG. 2 depicts a block diagram of a data processing system which may be implemented as a server in accordance with the present invention.

Referring now to FIG. 2, a block diagram of a data processing system which may be implemented as a server, such as server 106, 108, 160, or 170 in FIG. 1, is depicted in accordance with the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems 218–220 may be connected to PCI bus 216. Typical PCI bus implementations will support four PCI expansion slots or add-in connectors. Communications links to 2 network computers 120, 126, 134, and 142 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RS/6000, a product of International Business Machines Corporation in Armonk, N.Y., running the Advanced Interactive Executive (AIX) operating system.

Figure 3:
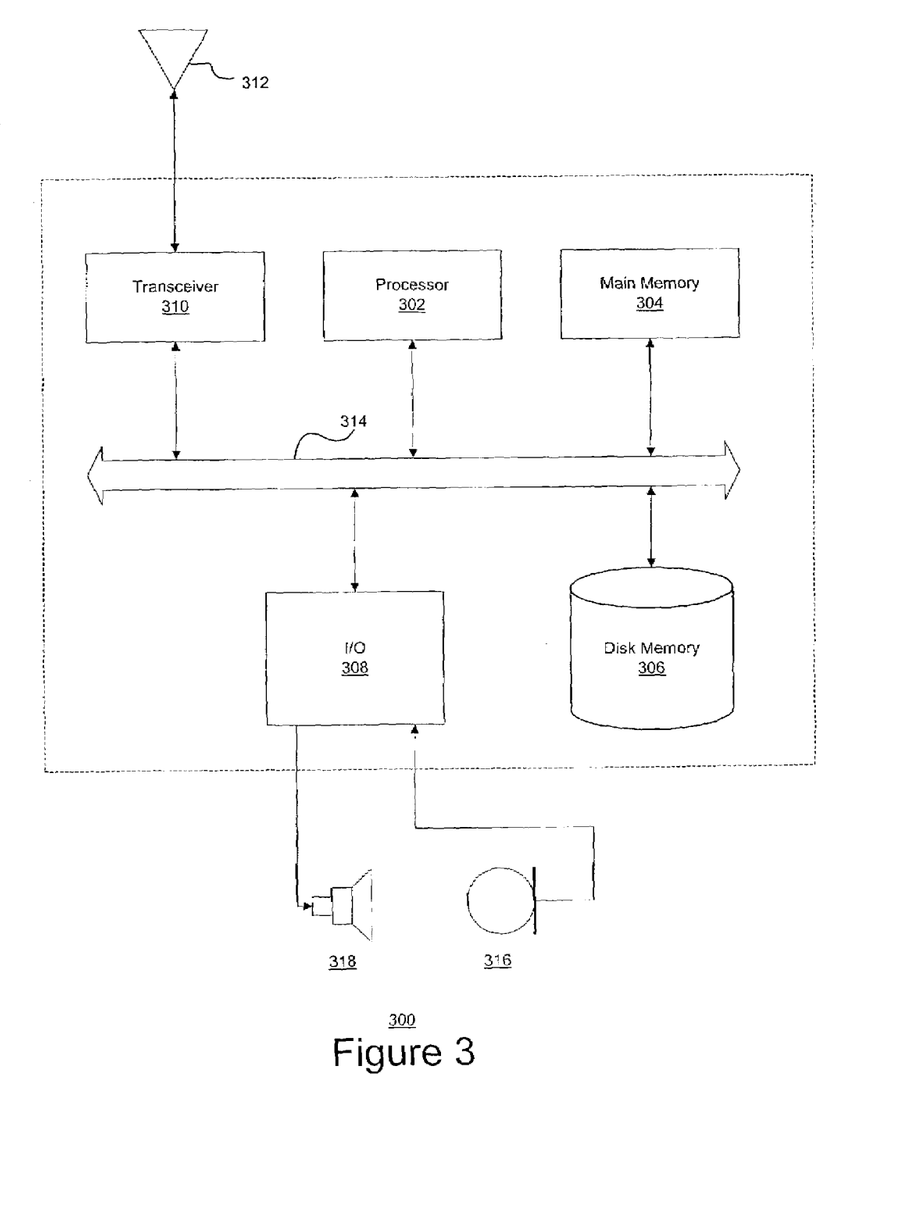
FIG. 3 depicts a block diagram of a portable device such as a personal digital assistant (PDA) in which the present invention may be implemented.

Turning now to FIG. 3, a block diagram of a personal digital assistant (PDA), such as portable device 164 in FIG. 1, is illustrated in which the present invention may be implemented. The PDA is typically a palmtop computer, such as, for example, a Palm VII, a product of 3Com Corporation in Santa Clara, Calif., connected to a wireless communications network and which may provide voice, fax, e-mail, and/or other types of communication. The PDA 300 may have one or more processors 302, such as a microprocessor, a main memory 304, a disk memory 306, and an I/O 308 such as a mouse, keyboard, or pen-type input, and a screen or monitor. The PDA 300 may also have a wireless transceiver 310 connected to an antenna 312 configured to transmit and receive wireless communications. The processor 302, memories 304, 306, I/O 308, and transceiver are connected to a bus 304. The bus transfers data, i.e., instructions and information, between each of the devices connected to it. The I/O 308 may permit faxes, e-mail, or optical images to be displayed on a monitor or printed out by a printer. The I/O 308 may be connected to a microphone 316 and a speaker 318 so that voice or sound information may be sent and received.

Figure 4:
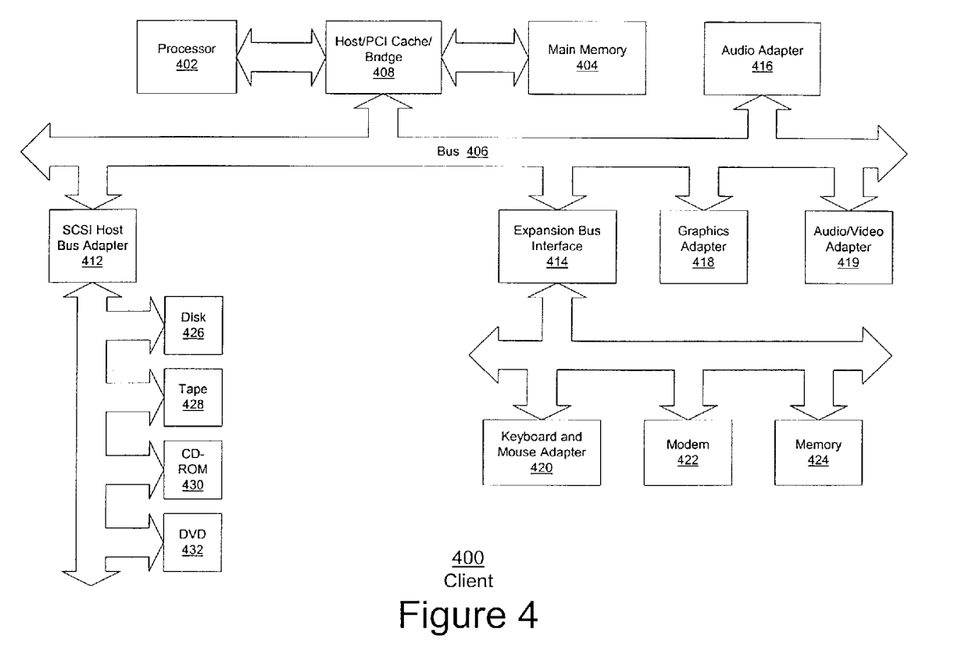
FIG. 4 depicts a block diagram of a data processing system in which the present invention may be implemented.

With reference now to FIG. 4, a block diagram of a data processing system in which the present invention may be implemented is illustrated. Data processing system 400 is an example of a client computer such as client 120, 126, 134, or 142 in FIG. 1. Data processing system 400 employs a peripheral component interconnect (PCI) local bus architecture. Although the depicted example employs a PCI bus, other bus architectures, such as Micro Channel and ISA, may be used. Processor 402 and main memory 404 are connected to PCI local bus 406 through PCI bridge 408. PCI bridge 408 may also include an integrated memory controller and cache memory for processor 402. Additional connections to PCI local bus 406 may be made through direct component interconnection or through add-in boards. In the depicted example, SCSI host bus adapter 412 and expansion bus interface 414 are connected to PCI local bus 406 by direct component connection. In contrast, audio adapter 416, graphics adapter 418, and audio/video adapter (A/V) 419 are connected to PCI local bus 406 by add-in boards inserted into expansion slots. Expansion bus interface 414 provides a connection for a keyboard and mouse adapter 420, modem 422, and additional memory 424. In the depicted example, SCSI host bus adapter 412 provides a connection for hard disk drive 426, tape drive 428, CD-ROM drive 430, and digital video disc read only memory drive (DVD-ROM) 432. Typical PCI local bus implementations will support three or four PCI expansion slots or add-in connectors.

An operating system runs on processor 402 and is used to coordinate and provide control of various components within data processing system 400 in FIG. 4. The operating system may be a commercially available operating system, such as OS/2, which is available from International Business Machines Corporation. "OS/2" is a trademark of International Business Machines Corporation. An object oriented programming system, such as Java, may run in conjunction with the operating system, providing calls to the operating system from Java programs or applications executing on data processing system 400. Instructions for the operating system, the object-oriented operating system, and applications or programs are located on a storage device, such as hard disk drive 426, and may be loaded into main memory 404 for execution by processor 402.

Those of ordinary skill in the art will appreciate that the hardware in FIG. 4 may vary depending on the implementation. For example, other peripheral devices, such as optical disk drives and the like, may be used in addition to or in place of the hardware depicted in FIG. 4. The depicted example is not meant to imply architectural limitations with respect to the present invention. For example, the processes of the present invention may be applied to multiprocessor data processing systems.

Figure 5:
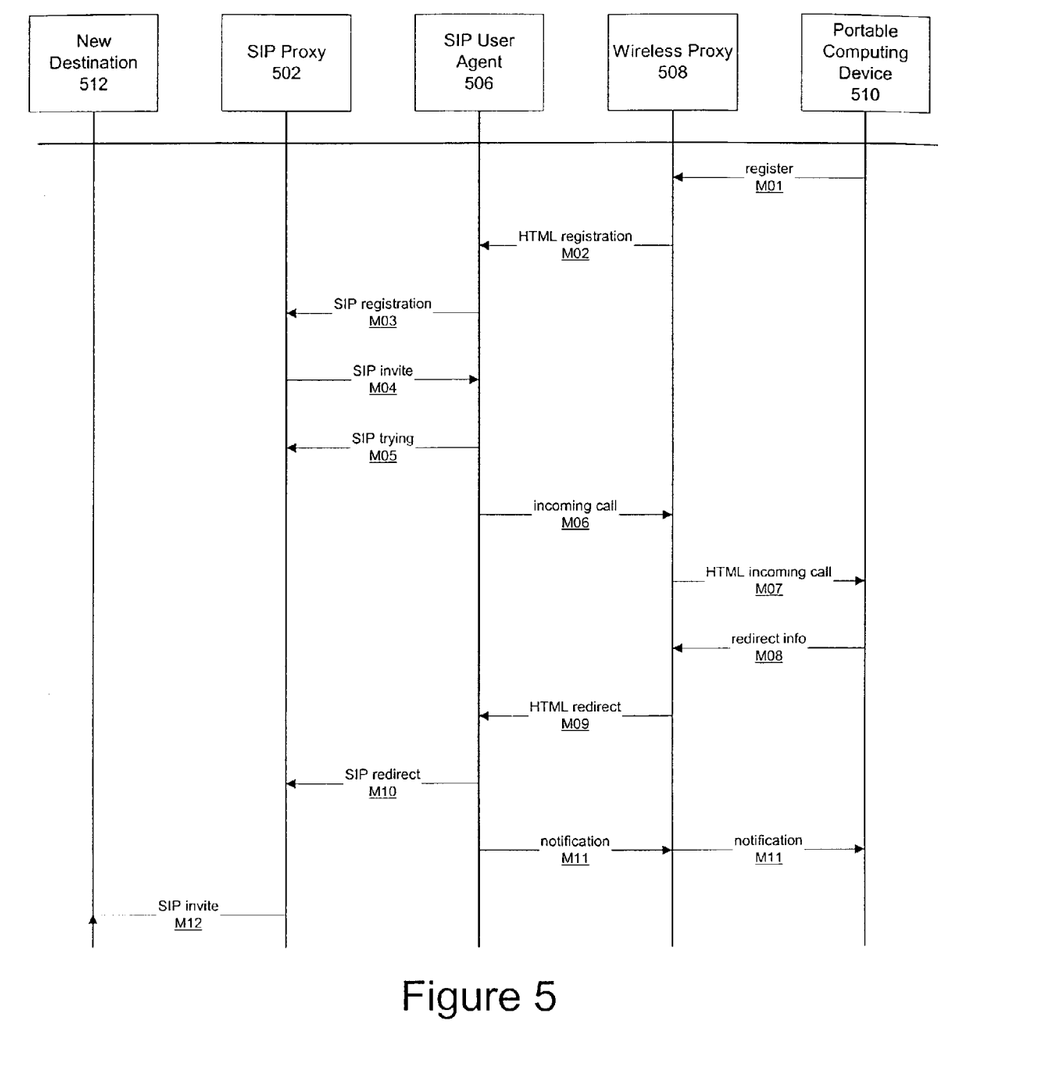
FIG. 5 depicts a message flow chart illustrating the processes of redirecting a call in real time from according to the present invention.

Turning now to FIG. 5, a message flow chart is depicted illustrating the processes of redirecting a call in real time from a wireless device according to the present invention. In this example, a redirect from a wireless device utilizing a wireless proxy is illustrated. A similar flow would result if the redirect were being sent from a LAN/WAN connected device except for the omission of wireless proxy 508.

Figure 6A:
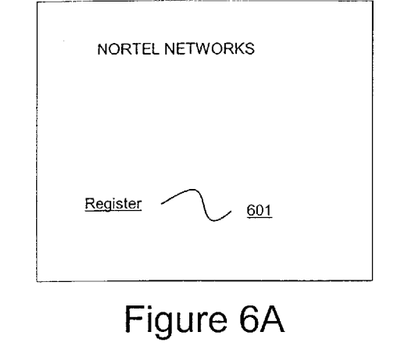
FIGS. 6A–6E illustrate examples of sample HTML or web pages displayed to a user of a portable computing device.
Figure 6B:
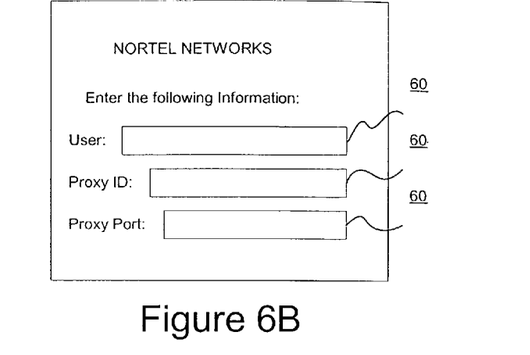

A user of a portable computing device such as a PDA or laptop computer initiates a registration by entering a proxy ID, a proxy port, and an address, such as, for example, a PSTN number or an IP address, and sending this information to wireless proxy 508 (step M01). FIGS. 6A illustrates an example of a sample HTML screen displayed to a user to initiate registration. The user may pull up the registration page by selecting the word "register" 601 on the page. FIG. 6B illustrates an example of a sample HTML screen allowing a user to register by providing prompts to enter an user name 602, a proxy identification 604, and a proxy port 606.

Wireless Proxy 508 receives the HTML registration web page and forwards it to SIP user agent 506 (step M02). User agent 506 receives the HTML page and sends a SIP registration to SIP proxy 502 (step M03). SIP proxy 502 updates its destination list for the user with the address for portable computing device 510. Next, an SIP invite signal is sent to user agent 506 (step M04).

Figure 6C:
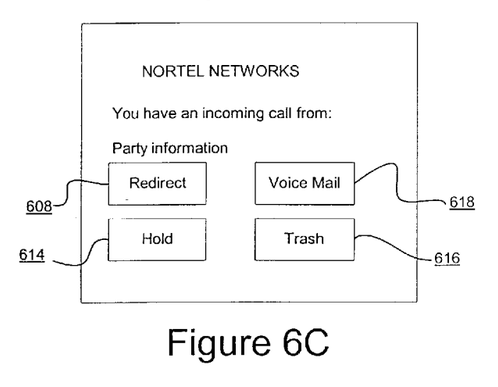
Figure 6D:
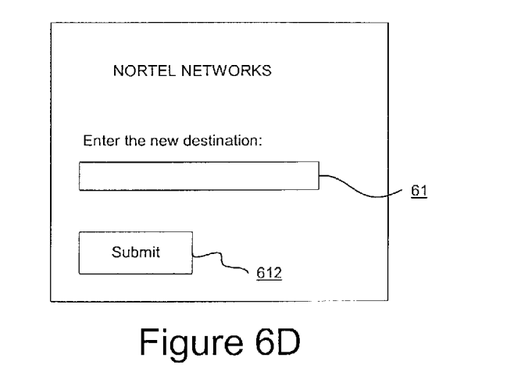

User agent 506 then sends an SIP 100-trying signal back to SIP proxy 502 (step M05). When a call for the user at portable computing device 510 is received by user agent 506, user agent 506 sends an HTML page to 3Com proxy 508 to indicate an incoming call for the user at portable computing device 510 (step M06). 3Com proxy 508 forwards the HTML page to portable computing device 510 (step M07). The HTML page is displayed the user of portable computing device 510 to indicate that the user has an incoming call. An example of such an HTML page is illustrated in FIG. 6C. A hot button 608 is supplied which the user may select to redirect the incoming call. Other hot buttons 614, 616, and 618 allow the user to place the call on hold, terminate the call without answering, or send the call to voice mail respectively. If redirection is chosen, the user of the portable computing device 510 then redirects the call to another destination by entering and sending a PSTN, IP, or other address as the new destination (step M08). FIG. 6D illustrates an example of a sample HTML page in which the user may enter the new destination for the incoming phone call in destination box 610 and then send the new destination by selecting the "submit" hot button 612.

Figure 6E:
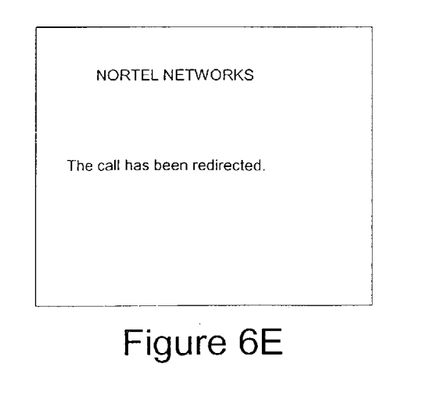

Wireless proxy 508 receives the HTML page containing the new destination and this page is forwarded to user agent 506 (step M09). User agent 506 sends a SIP 300 signal to SIP proxy 502 containing the new destination (step M10). User agent 506 also sends an HTML page to portable computing device 510 via 3Com proxy 508 indicating that the call was redirected (step M11). A message is displayed to the user of portable computing device 510 indicating that the call was redirected. An example of such a HTML page is illustrated in FIG. 6E. SIP proxy 502 receives the 300 signal and sends out an invite to the new destination (step M12).

If portable computing device 510 does not respond to the message indicating that the user has an incoming call (step M07), then a SIP 480 Temporarily not available signal is sent from user agent 506 back to SIP proxy server 502. SIP proxy 502 can then decide how to process the call. For example, for calls to which the portable computing device does not respond, SIP proxy 502 could forward the call to a predefined destination or take the call down.

Figure 7:
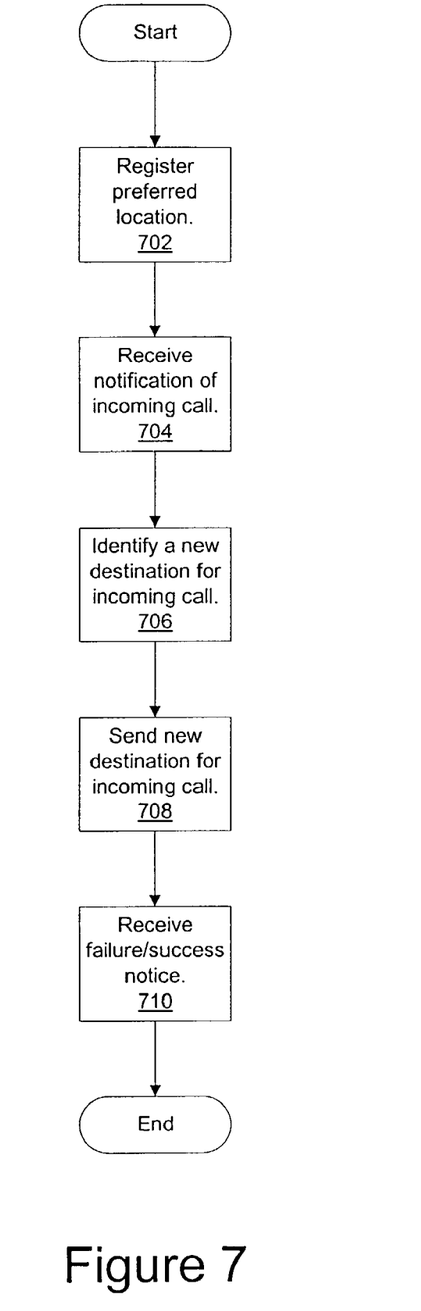
FIG. 7 depicts a flowchart illustrating the methods executed on a portable computing device in accordance with a preferred embodiment of the present invention.

Turning now to FIG. 7, a flowchart illustrating the methods executed on a portable computing device in accordance with a preferred embodiment of the present invention is depicted. To start, a user of a data processing device registers the address of their data processing device that they wish their calls to be delivered to (step 702). Typically, when the data processing device is activated, it performs an SIP registration with a SIP registration server, effectively causing all future calls to route to this device as the first selection. On deactivation of the device, the shutdown processing unregisters with the SIP registration server thereby restoring the defaults on how the called party is to be reached (i.e., the subscriber's static reach list). Next, when a call is made to the user, a notification of the incoming call is received at their data processing device (step 704). Included in the notification may be caller identification information such as PSTN or IP address from where the call originated. The user then identifies a new destination for the incoming call to be sent (step 706). For example, if the user has traveled to a hotel, the user may enter the phone number of the room at the hotel. As another example, if the user is near a pay phone, the user may enter the phone number of the pay phone. Once the user has identified a new destination for the incoming call to be redirected to, this new destination is sent back to a SIP proxy via a SIP User Agent (step 708). Once the SIP User Agent receives the redirect request, the user will receive a notice indicating the call is being redirected (step 710).

Figure 8:
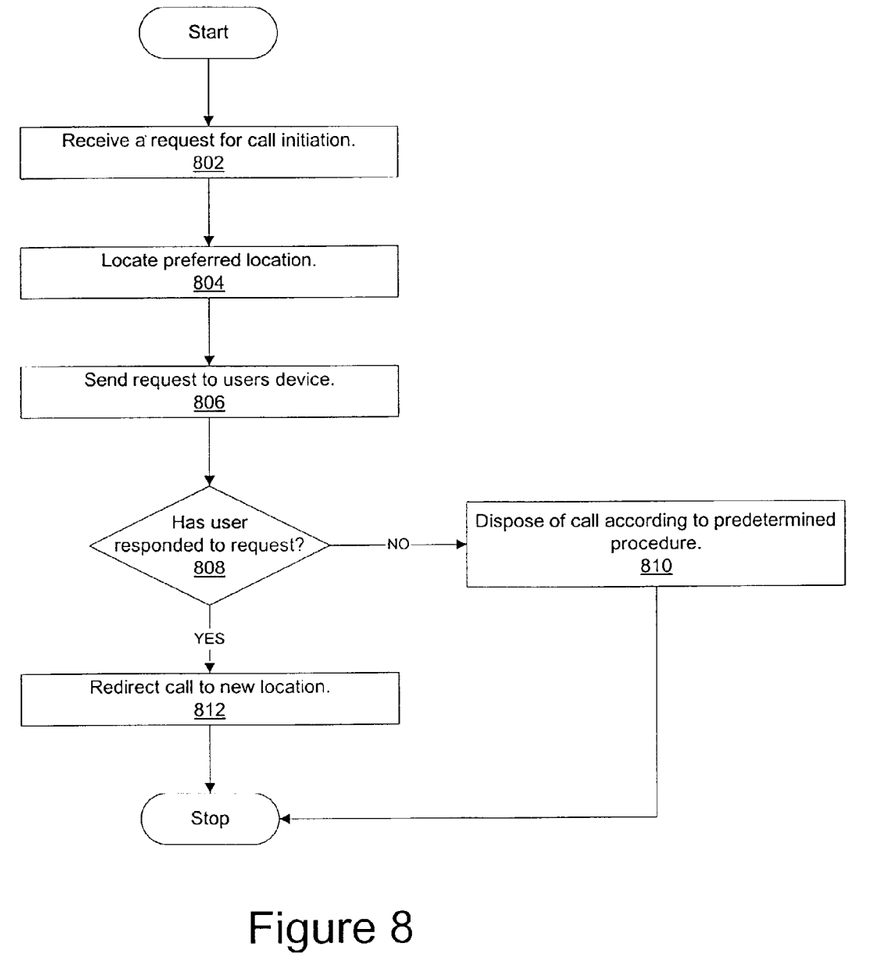
FIG. 8 depicts a flowchart illustrating the processes of redirecting a call which are implemented on a server within the communications network in accordance with the present invention.

Turning now to FIG. 8, a flowchart illustrating the processes of redirecting a call which are implemented on a server within the communications network is depicted in accordance with the present invention. To start, a server within the communications network receives a request for call initiation from a PSTN (step 802). The server accesses a database to which the called party has registered the current device to which they wish their calls directed (step 804). The current device is registered at the top of a static reach list of numbers to try in order to reach the called party. Once the current device is identified, a notice is sent to the called parties current location indicating that the party has an incoming call and requesting information about where to direct the call (step 806). Next, a determination is made as to whether the user has responded to the request (step 808). If the user does not respond after a given period of time, then the call is disposed of according to a predetermined procedure (step 810). For example, if the user does not respond to the request, then the server may redirect the call to the next address in the called party's static reach list of preferred locations or if there are no more preferred locations stored in a database, the server may end the call. If the user does respond to the request, then the call is redirected to the new location and a confirmation is sent to the user indicating such (step 812). The call may be redirected to a cell phone, to a nearby wire-line device, to the called party's voice mailbox, or the party initiating the call may be placed on temporary hold. If the party initiating the call is placed on hold, a standard greeting will be sent to the calling party to make them aware that the called party is attempting to find an appropriate method to receive the call or is on another call and to stay on the call because the called party will answer momentarily.

Figure 9:
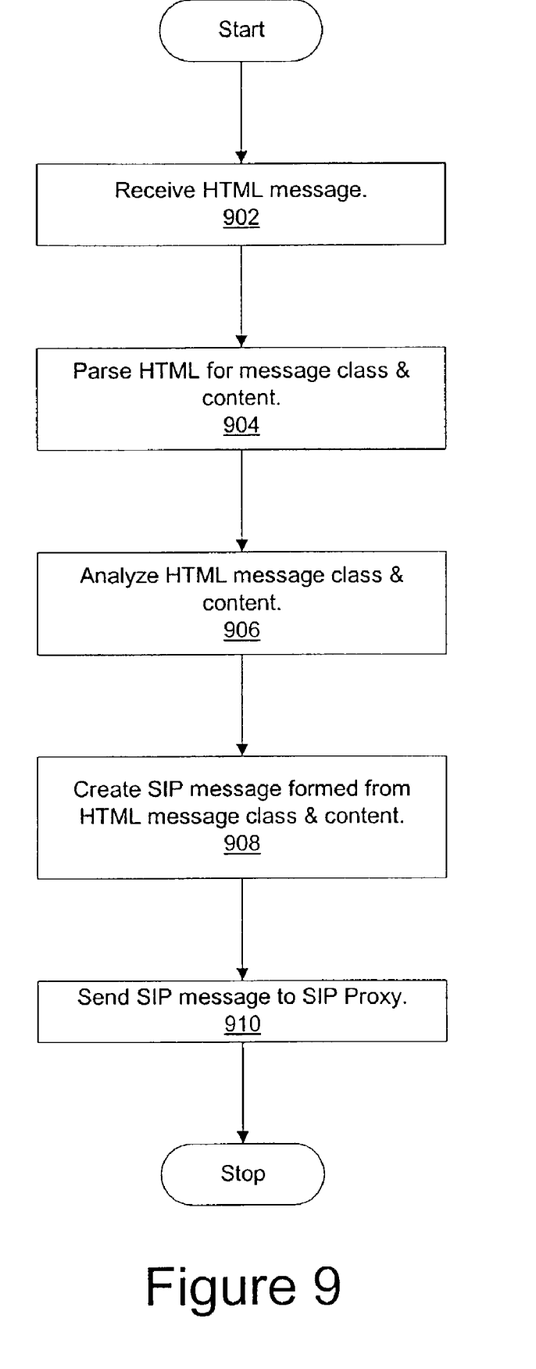
FIG. 9 depicts a flowchart illustrating a method of converting HTML to SIP as performed by a SIP User Agent in accordance with the present invention.

Turning now to FIG. 9, a flowchart illustrating a method of converting HTML to SIP as performed by a SIP User Agent is depicted in accordance with the present invention. To start, a SIP User Agent receives an HTML message (step 902). The SIP User Agent then parses the HTML message for class and content (step 904). The SIP User Agent then analyzes the message class and content (step 906) to create an SIP signal from the HTML message (step 908). The newly formed SIP signal is then sent to an SIP Proxy (step 910) and the process stops.

Figure 10:
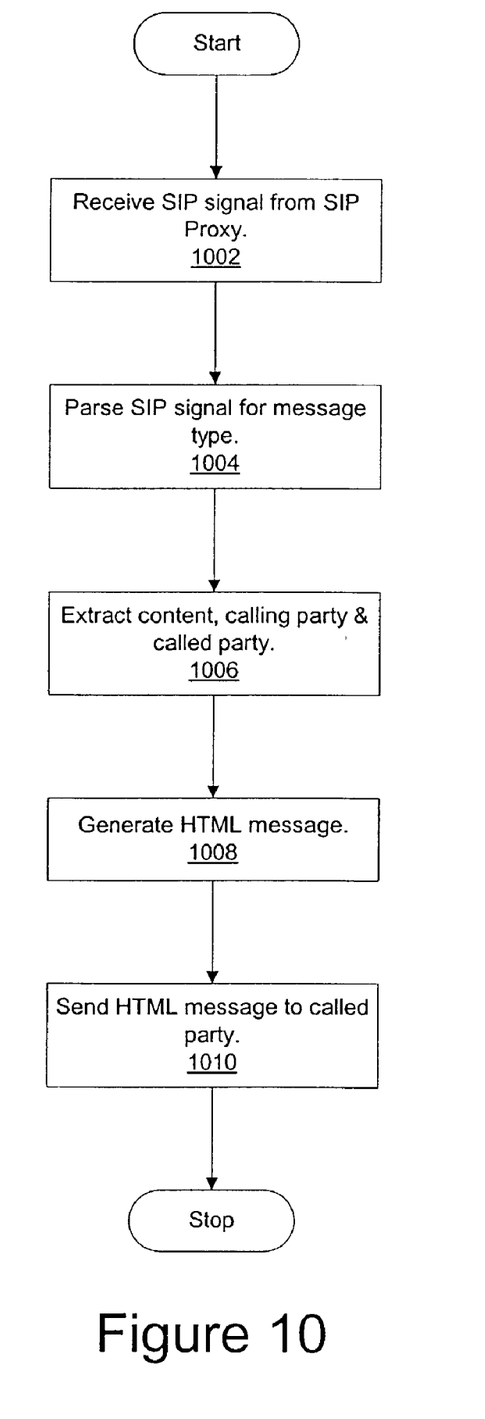
FIG. 10 depicts a flowchart illustrating a method of converting an SIP signal into an HTML message in accordance with the present invention.

Turning now to FIG. 10, a flowchart illustrating a method of converting an SIP signal into an HTML message is depicted in accordance with the present invention. First, the SIP User Agent receives an SIP signal from the SIP Proxy (step 1002). The SIP signal is then parsed for message type (step 1004) and the content, calling party, and called party are extracted from the SIP signal (step 1006). Using the extracted information, the SIP User Agent generates an appropriate HTML page (step 1008) and sends the HTML message to the called party (step 1010) ending the process.

Although the present invention has been described primarily with reference to redirecting telephony communications. Other forms of media streams may be redirected as well. For example, a client such as client 120 or portable device 164, that has previously performed an SIP registration, receives a notification of incoming data streams. The notification will include information about what types of data streams are included. This will be encoded into the notification at either SIP Proxy 170 or at User Agent 172. The notice displayed to the user will inform the user of whether there are multiple types of data streams and what types of data streams are in the incoming communication. Once the notification is displayed to the user of the client, the client may then decide how to dispose of the incoming data streams. If the user selects one device, such as telephone 124 to send the data stream to, then the name or address of telephone 124 will be sent back to SIP Proxy 170, which will then redirect the call to telephone 124. The user may select more than one device to send the data streams to as well. If the data stream consists of multiple data types, the user may instruct SIP Proxy 170 to send each data stream to a different type of device. Furthermore, the user may instruct SIP Proxy 170 to send all of the data streams to several locations (forking) such that multiple parties may be connected (such as for a conference call) or to several locations, but have only the first to "pick up" or "answer" be connected. This last alternative might be useful if the user wished to redirect the data stream to another person, but was unsure of that person's location but did know of several possible locations of that person.

To help illustrate the present invention, consider the following example of a user's device receiving multiple types of data streams at a single device. For example, a user might have registered their personal digital assistant as the device to which to have incoming data streams routed. The SIP Proxy 170 receives an incoming data stream intended for this user and generates and routes a message to the user indicating the types of message streams and from what party. The types of message streams include audio, video (in MPEG format), text and a JPEG picture. The user of the personal digital assistant might decide to route the audio to speakers or to a telephone such as telephone 124, route the video to a desktop computer such as client 120 or to a television attached to a set top box, the text routed to a printer (perhaps connected to client 120), and the JPEG picture routed to a second computer such as client 126 or to a device dedicated to generating and displaying still pictures. Thus, each of the data streams were directed to a device which was best able to utilize and present the information to the user.

To illustrate "forking", consider a person receiving a data stream (perhaps a phone call, but not necessarily). The person after determining what the data stream is and/or who it is from, decides that other people within an organization should participate as well. The person would then enter several names or addresses for the SIP Proxy 170 to use to redirect the data stream. This list of several names could include the user originally receiving the notification. In that way several people could participate, such as on a conference call.

In yet another example of forking, the user could receive notification of an incoming call and determine that that call was for another person. However, the user does not know the exact location of the other person, but does know of several locations where that person might be. The user in this case would enter several location names and instruct the proxy to redirect the call to each of them and connect the location which "picked up" first. In that manner the call is forwarded to the correct party even though the user receiving the notification knew no more than several possibilities of locations.

Although the present invention has been described primarily with reference to presenting call notification information to the called party through means of a display, other methods are also possible. Such methods include, but are not limited to, notifying the called party of an incoming call through the use of sounds or through a voice synthesizer if the portable device supported such options. Furthermore, as another option, the portable computing device could vibrate to indicate that the user had an incoming call. The use of sounds and vibrations could also be used to alert the called party of an incoming call such that they could direct their attention to a visual display which would indicate the nature and origin of the call.

Although described primarily with reference to SIP, an SIP proxy and an SIP user agent, other communications initiation and routing protocols, such as H.323 Protocol, can be utilized as well. Furthermore, other text based or XML based protocols may be utilized rather then HTTP and HTML. Examples of other protocols include, but are not limited to, Voice XML (VOXML), Speech Markup Language (SML), WAP, and XHTML. In such cases the SIP user agent would be replaced with a user agent which translated between the appropriate protocols.

It should be noted that although the present invention has been described with reference to utilizing a SIP proxy, a proxy of any kind is not necessary if the complete IP address of the device to which the call is to be directed is known and used. Furthermore, the SIP user agent is not necessary if all of the terminal devices (e.g., portable data processing systems, personal digital assistants, phones, desk top computers, cell phones) involved in a calling process utilize SIP such that communications with the SIP proxy does not need to be facilitated with a translating user agent. In this case, the SIP proxy becomes the agent. Furthermore, the SIP proxy does not have to be a proxy. Any device or software which can perform the functionality of the SIP proxy will suffice, wherein the primary functions performed by the SIP proxy are address lookup (determining the IP or other type address based on information received, i.e., converting john@nortel.com into an IP address) and redirecting calls.

It should also be noted that although the present invention has been described primarily with reference to voice calls, it applies to other types of communication as well, including, but not limited to for example, video conferencing or text messages. For example, a portable computing device could receive a notification of an incoming video call or video message and a user could redirect that incoming video message to a laptop or desktop computer, a television, or other video display terminal such that the video could be viewed by the called party. The device receiving the request could even suggest alternative destinations to redirect the call to based on the type of call (e.g. video, voice, text) the request corresponds to.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. For example, the present invention is not limited to SIP and Palm VII's. Other types of call initiation protocols other than SIP may be utilized. Furthermore, other types of portable devices other then Palm VII's may be utilized including, but not limited to, portable computers, laptop computers, other types of personal digital assistants (PDAs), and other handheld data processing systems. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a communications system for processing a call, the method comprising:
   receiving, at a session initiated protocol (SIP) server, a notice of a call for a mobile data processing system associated with a user;
   identifying an address to which the call is to be sent from a database of preferred locations, wherein the user has previously indicated a preferred location;
   sending a first request to setup the call to the mobile data processing system associated with the user, wherein the mobile data processing system has a wireless communications capability;
   sending a notification message to the mobile data processing system indicating the first request to setup the call, wherein the notification is presented to the user via the mobile data processing system; and, in response to the notification, user input is received from the user identifying an address to which the call is to be directed;
   receiving, prior to establishing the call, a response to the request, wherein the response includes the address for the call input by the user of the mobile data processing system in response to receiving the notification message; and
   sending a second request to setup the call to the user using the address.

2. The method as recited in claim 1, wherein the data processing system is a personal digital assistant.

3. The method as recited in claim 2, wherein the personal digital assistant is a Palm VII.

4. The method as recited in claim 1, wherein the request and the response are session initiation protocol messages.

5. A method for processing a call at a data processing system the method comprising:
   receiving, at a session initiated protocol (SIP) server, a notice of a call for a mobile data processing system associated with a user;
   identifying an address to which the call is to be sent from a database of preferred locations, wherein the user has previously indicated a preferred location;
   receiving a notification message at the data processing system indicating a request to setup the call;
   presenting the notification to the user at the data processing system;
   receiving the request to establish the call;
   presenting caller information at the data processing system;
   receiving user input from the user identifying an address to which the call is to be directed; and
   responsive to an identification of the address for the call, returning a response including the address to which the call is to be directed.

6. The method as recited in claim 5, wherein the step of presenting caller information comprises displaying the caller information.

7. The method as recited in claim 5, wherein the step of presenting caller information comprises presenting the caller information audibly.

8. The method as recited in claim 5, wherein the request and the response are session initiation protocol massages.

9. The method as recited in claim 5, wherein the data processing system is a wireless device.

10. The method as recited in claim 5, wherein the step of presenting caller information comprises a vibrating alert.

11. The method as recited in claim 5, wherein the data processing system is a two-way pager.

12. A method for initiating calls, comprising the steps of:
    receiving a registration notice of an incoming call, wherein said registration notice is formatted in a first protocol;
    translating said registration notice from the first protocol into a second protocol to form a modified registration notice; and
    transmitting the modified registration notice to a terminating device; wherein the modified registration notice is formatted in the second protocol.

13. The method as recited in claim 12, further comprising:
    selecting, at a session initiated protocol (SIP) server, an address to which the user has previously selected the call be sent from a database of preferred locations;
    receiving a location data with which to redirect the incoming call from the terminating device; wherein the location data is formatted in the second protocol; and
    translating the location data to a second location data; and
    transmitting the second location data, wherein the second location data is formatted in the second protocol.

14. The method as recited in claim 12, wherein the first protocol is a session initiation protocol.

15. The method as recited in claim 12, wherein the second protocol is a hypertext markup language.

* * * * *